Patented Feb. 6, 1940

UNITED STATES PATENT OFFICE 2,189,062

PROCESS FOR THE SEPARATION OF PROPANE AND PROPYLENE FROM GAS MIXTURES

Paul Feiler, Ludwigshafen-on-the-Rhine, Germany, assignor to I. G. Farbenindustrie Aktiengesellschaft, Frankfort-on-the-Main, Germany No Drawing. Application February 9, 1938, Serial No. 189,706. In Germany February 16, 1937

1 Claim. (Cl. 260—676)

The present invention relates to a process for the separation of propane and propylene from gas mixtures containing the same.

It has already been proposed to separate gaseous unsaturated hydrocarbons, as for example acetylene and ethylene, from gases containing the same in addition to other gases, in particular gaseous methane hydrocarbons; it has been proposed, inter alia, to carry out the said separation by means of liquefied substances which are gaseous or vaporous at ordinary temperature and ordinary pressure (hereinafter referred to as "liquefied normally gaseous" substances) as solvents for the unsaturated hydrocarbons.

I have now found that propane and/or propylene may be separated from gas mixtures containing one or both of the said hydrocarbons and also hydrocarbons, in particular methane or ethane or ethylene, if desired in addition to gases free from carbon, by washing the gas mixtures with liquefied normally gaseous halogenated hydrocarbons, as for example methyl chloride, ethyl chloride and vinyl chloride. In this way propane and propylene are dissolved and the said hydrocarbons may then readily be recovered from the washing agent by known methods.

The solubility characteristics may be seen from the following table which gives the amount (measured in cubic centimeters) of hydrocarbon dissolved in 1 cubic centimeter of washing agent at 40° below zero C. at ordinary pressure:

| Solvent | $CH_4$ | $C_2H_6$ | $C_2H_4$ | $C_3H_8$ | $C_3H_6$ |
|---|---|---|---|---|---|
| Methyl chloride | | | | 230 | 150 |
| Ethyl chloride | | 20 | 10 | 490 | 790 |
| Vinyl chloride | | | | 360 | 300 |

Thus in the said manner it is possible by simple washing to separate propane and/or propylene from gas mixtures containing one or both of the said hydrocarbons, as for example natural gases, distillation gases and cracking gases which have been obtained for example by heating oils, tars, bituminous coals or gaseous methane hydrocarbons or gases containing the same to temperatures above 400° C., waste gases of the hydrogenation of carbonaceous substances and similar gases.

If the initial gases also contain hydrocarbons having more than 3 carbon atoms, as for example butane, butadiene and vinyl-acetylene, these are also washed out. If it is desired to wash out propane or propylene by themselves, it is necessary first to remove the higher hydrocarbons; this may be effected for example by cooling, oil washing, compression or by means of active carbon.

The washing agents may also be used in admixture with each other or with other solvents or substances which are liquid under the given conditions. The washing is preferably carried out under increased pressure, in which case ordinary temperature may often be used, whereas at ordinary pressure it is preferable to carry out the washing at temperatures in the neighbourhood and above the boiling point of the hydrocarbons to be washed out, as for example at from 20° below zero to from 40° to 45° below zero C. The removal of the hydrocarbons from the washing agent may be effected by raising the temperature, reducing the pressure or by other means.

When propylene and propane are both present in the initial gas, there is obtained in the said manner a mixture of the two gases which may be separated in known manner, as for example by washing with aqueous solutions of cuprous or mercurous salts.

The process may be carried out for example in washing towers, which may be provided with filler bodies if desired, or in immersion washers (washing bottles). The gases may also be subjected to a repeated washing.

The following examples will further illustrate the nature of this invention but the invention is not restricted to these examples.

Example 1

26 liters of a mixture of 50 per cent by volume of propane and 50 per cent of ethane are led through three consecutive washing bottles each containing 50 cubic centimeters of liquid ethyl chloride and each cooled to 43° below zero C.; 14 liters in all are absorbed by the liquid ethyl chloride. The absorbed gas is expelled by warming the washing agent to 0° C. and it consists of about 90 per cent of propane and 10 per cent of ethane. The non-absorbed gas consists of about 90 per cent of ethane and 10 per cent of propane. Mixtures of propane and methane may be separated even more sharply.

Example 2

31 liters of a mixture of 50 per cent by volume of ethylene and 50 per cent of propylene are led through three consecutive washing vessels each containing 50 cubic centimeters of liquid ethyl chloride and each cooled to 43° below zero C. In this way 15.7 liters of gas in all are absorbed by the liquid ethyl chloride. The absorbed gas is expelled by heating the washing agent to 0° C.; it consists of 86 per cent by volume of propylene, the remainder being ethylene. The non-absorbed gas consists of 90 per cent of ethylene, the remainder being propylene.

Example 3

A mixture of gaseous hydrocarbons is first cooled to 10° below zero C. to separate butanes and butylenes. After the separation of the said hydrocarbons, the gas mixture has the following composition:

| | Per cent by volume |
|---|---|
| $C_3H_6$ | 20.4 |
| $C_2H_4$ | 25.4 |
| $C_3H_8$ | 24.8 |
| $C_2H_6$ | 15.4 |
| $CH_4$ | 14.0 |

For the purpose of separating propane and propylene, the gas mixture is then led at 43° below zero C. through three washing bottles arranged one behind another and each containing 50 cubic centimeters of liquid vinyl chloride. Of 15 liters of gas led through, 7 liters are absorbed. The absorbed gas is expelled by heating and has the following composition:

| | Per cent by volume |
|---|---|
| $C_3H_6$ | 50.5 |
| $C_2H_4$ | 2.7 |
| $C_3H_8$ | 45.0 |
| $C_2H_6+CH_4$ | 1.8 |

The non-absorbed gas (8 liters) has the following composition:

| | Per cent by volume |
|---|---|
| $C_3H_6$ | 1.1 |
| $C_2H_4$ | 42.2 |
| $C_3H_8$ | 6.2 |
| $C_2H_6+CH_4$ | 50.5 |

The unsaturated hydrocarbons may be separated from the saturated hydrocarbons in the two gas mixtures obtained for example by means of cuprous salt solutions.

What I claim is:

A process for the recovery of at least one of the hydrocarbons propane and propylene from gas mixtures containing the same besides at least one of the other hydrocarbons methane, ethane and ethylene, which comprises washing the gas mixtures with liquefied normally gaseous chlorinated hydrocarbons and recovering the propane and propylene from the washing agent by known methods.

PAUL FEILER.